(12) United States Patent
Kirby (10) Patent No.: US 7,114,518 B2
(45) Date of Patent: Oct. 3, 2006

(54) FLOW REGULATING VALVE (75) Inventor: Lane C. Kirby, Westpoint, IN (US)

(73) Assignee: Tuthill Corporation, Burr Ridge, IL (US)

( * ) Notice: Subject to any disclaimer, the term of this patent is extended or adjusted under 35 U.S.C. 154(b) by 182 days.

(21) Appl. No.: 10/965,479

(22) Filed: Oct. 14, 2004

(65) Prior Publication Data
US 2006/0081295 A1  Apr. 20, 2006

(51) Int. Cl.
F16K 31/12 (2006.01)

(52) U.S. Cl. .................... 137/504; 137/512.1

(58) Field of Classification Search ............. 137/504, 137/512.1, 513.3, 533.21, 533.29, 533.31
See application file for complete search history.

(56) References Cited

U.S. PATENT DOCUMENTS

| | | | | |
|---|---|---|---|---|
| 2,554,390 A | | 5/1951 | Stevenson | |
| 2,584,418 A | * | 2/1952 | Branson | 137/504 |
| 2,690,762 A | | 10/1954 | Adams | |
| 3,130,747 A | * | 4/1964 | Benaway | 137/504 |
| 3,145,730 A | * | 8/1964 | Presnell | 137/493.2 |
| 3,170,481 A | | 2/1965 | Presnell | |
| 3,339,580 A | * | 9/1967 | Cutler et al. | 137/504 |
| 3,741,241 A | * | 6/1973 | Jackson | 137/504 |
| 3,872,884 A | * | 3/1975 | Busdiecker et al. | 137/498 |
| 4,044,791 A | | 8/1977 | McKenzie | |
| 4,704,947 A | | 11/1987 | Schneider | |
| 4,932,435 A | | 6/1990 | Stroze et al. | |
| 5,148,830 A | | 9/1992 | Liu | |
| 5,320,135 A | | 6/1994 | Pierrou | |
| 6,546,839 B1 | | 4/2003 | Jamra et al. | |
| 2004/0000341 A1 | | 1/2004 | Kim | |

FOREIGN PATENT DOCUMENTS

| | | |
|---|---|---|
| FR | 2560694 | 9/1985 |
| GB | 2 133 122 A | 7/1984 |
| WO | WO 99/10791 | 3/1999 |

* cited by examiner

Primary Examiner—Eric Keasel
Assistant Examiner—Craig Price
(74) Attorney, Agent, or Firm—George Pappas (57) ABSTRACT A valve assembly that includes a valve body defining a fluid passage. First and second ends of the fluid passage define first and second ports for fluid flow. A spring and piston are located in the fluid passage. The piston has a travel length extending between first and second positions with a third position located therebetween. The spring biases the piston from the first toward the third position and is located outside the axial piston passage. The piston at least partially defines a first, second and at least one third opening. The first opening defines a variable constriction which increases in size as the piston moves from the first to third positions. The piston end wall defines the second opening and the piston sidewall defines the third openings. Movement of the piston from the third to second position exposes the third openings increasing the area of the second port.

27 Claims, 3 Drawing Sheets

FLOW REGULATING VALVE

BACKGROUND OF THE INVENTION

1. Field of the Invention

The present invention relates to valves and, more specifically, to a flow regulating valve that regulates the flow of fluid in one direction and allows the generally unregulated flow of fluid in the opposite direction.

2. Description of the Related Art

In vehicles employing hydraulic systems, it is known to employ valves that limit the flow of the hydraulic fluid through a fluid line leading to a hydraulic actuator such as a hydraulic motor or cylinder to a maximum flow rate. For example, in a combine harvester it is known to use an internal combustion engine to power a hydraulic pump. The hydraulic pump provides hydraulic fluid under pressure to a hydraulic circuit. Each of the driven wheels of the combine harvester may include a separate hydraulic motor that is powered by the hydraulic circuit. Each of the motors may be located in a separate loop in communication with the hydraulic circuit. By reversing the direction of flow through the individual loops with the use of a reversing pump, reversing valve or other suitable means, the rotational direction in which the wheel is driven may also be reversed.

In such a loop, it is known to provide two flow regulating valves, one on each side of the hydraulic motor. The flow regulating valves are positioned in the loop such that one of the valves limits the flow of hydraulic fluid through the hydraulic motor, or other hydraulically driven device, to a maximum flow rate in a first direction while the other valve limits the flow to a maximum flow rate in the opposite direction. During operation, while one valve is regulating flow, it is desirable for the other valve in the loop that is not performing a flow regulating function to freely pass the fluid therethrough with a minimal pressure drop and without restricting the flow rate of the fluid.

Figure 1:
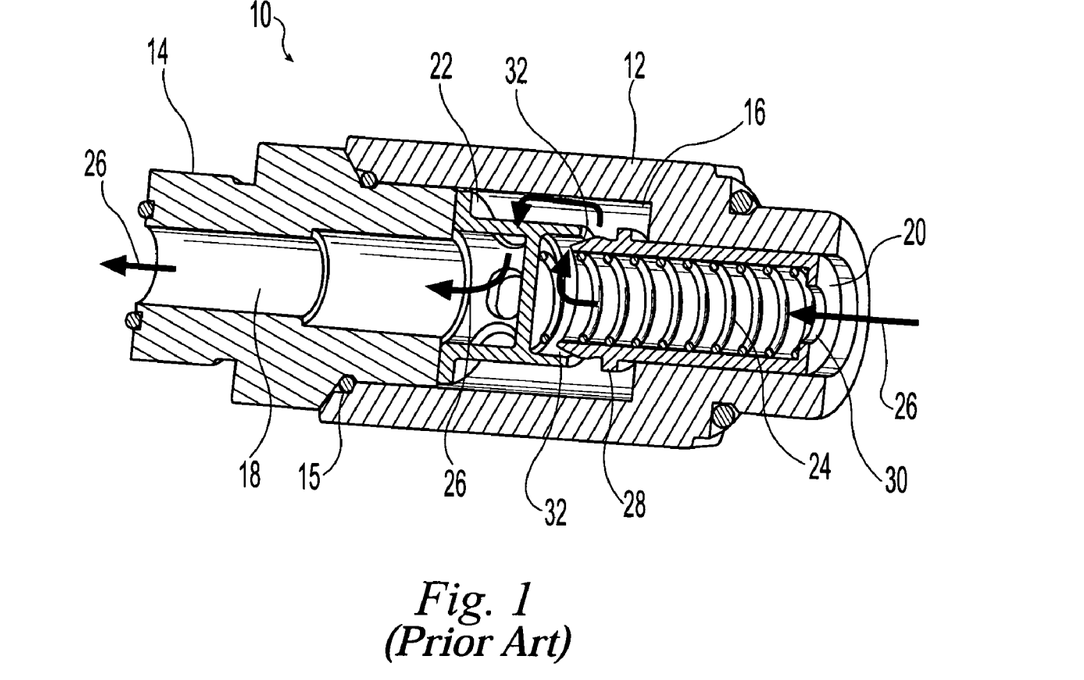
FIG. 1 is a cross sectional view of a conventional flow regulating valve.
Figure 2:
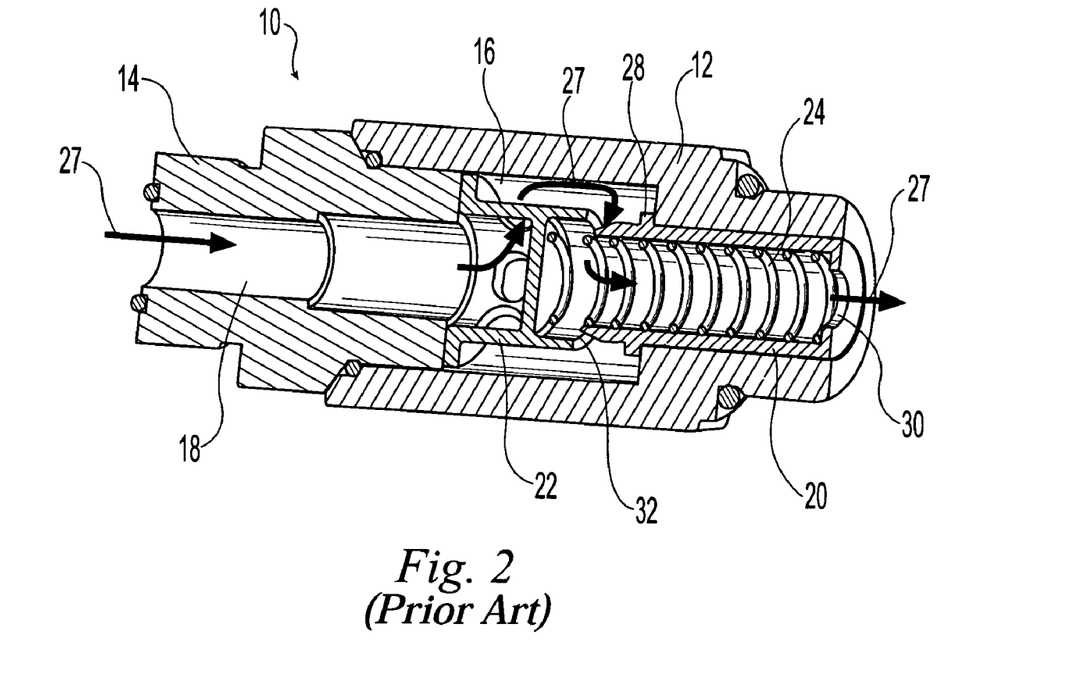
FIG. 2 is another cross sectional view of the conventional flow regulating valve of FIG. 1.

By providing flow regulating valves in each individual hydraulic motor loop, if one of the driven wheels begins slipping, the flow of hydraulic fluid to the slipping wheel will be limited to the maximum flow rate permitted by the valve. Limiting the flow rate of hydraulic fluid to the slipping wheel prevents excess flow of hydraulic fluid to the slipping wheel from depriving the remaining wheels of a sufficient flow of hydraulic fluid as well as preventing the uncontrolled spinning of the slipping wheel which can result in damage to the turf, cropland and/or tire. FIGS. 1 and 2 illustrate one known example of such a flow-regulating valve.

The valve 10 shown in FIGS. 1 and 2 includes a valve body 12 that receives outlet adapter 14 with an O-ring 15 or other suitable means providing a seal therebetween. Valve body 12 and outlet adapter 14 both include axially extending passages 16 and 18, respectively, for conveying hydraulic fluid. Valve 10 also includes piston 20, baffle member 22 and spring 24 which provide for the regulation of fluid flow through the valve. Valve 10 limits the flow of hydraulic fluid to a predetermined design flow rate when hydraulic fluid is flowing through valve 10 in the direction indicated by flow arrows 26 in FIG. 1. When hydraulic fluid is flowing in this regulated direction, piston 20 will initially be in the position shown in FIG. 2 wherein spring 24 biases piston 20 away from baffle 22 to a point where radial flange 28 engages valve body 12. The flow rate of hydraulic fluid through valve 10 is dependent upon the pressure differential across valve 10. When the flow of hydraulic fluid through calibrated orifice 30 in the direction indicated in FIG. 1 increases, the pressure differential acting on piston 20 will also increase. When the pressure differential and resulting force on the piston 20 exceeds the biasing force of spring 24, piston 20 will be biased towards baffle 22. As piston 20 moves towards baffle 22, the annular orifice 32 defined between piston 20 and baffle member 22 decreases in size thereby restricting the flow of fluid through the valve. By properly selecting the spring and valve dimensions, valve 10 may be used to limit the flow of fluid in the direction indicated in FIG. 1 to a maximum predetermined flow rate.

In FIG. 2, the flow of hydraulic fluid through valve 10 is in the opposite return flow direction as indicated by flow arrows 27. When fluid is flowing in this return direction, there is no fluid flow force to counteract the biasing force of spring 24 and annular orifice 32 maintains a constant size regardless of the flow rate or pressure differential of the hydraulic fluid. Consequently, valve 10 does not positively control the flow rate of the hydraulic fluid through the valve in the return direction and flow is limited by the size of the metering orifice 30. In other words, the valve does not regulate the flow of fluid through the valve when the fluid is flowing in the direction indicated by arrows 27 in FIG. 2 but rather the limited size of metering orifice 30 restricts the flow of fluid through the valve resulting in a pressure drop across the valve and undesirable power losses and heating of the fluid.

Another example of a known flow compensating valve assembly is shown in U.S. Pat. No. 5,320,135. The valve assembly disclosed in this patent may be used with hydraulic cylinders found in hydraulic platform lifts. The compensator valve 1 includes a valve body 10 receiving a sleeve 12 having an upper portion 16 and a lower portion 18. A piston 20 is sliding received within sleeve 12 and, as best seen in FIGS. 3–6, a spring 30 is provided between the bottom end 19 of the lower sleeve portion 18 and the top end wall 21 of piston 20. Piston 20 includes an axial main port 22 and a pair of relief ports 23a and 23b on its side wall periphery portion. In operation, as shown in FIG. 3, when hydraulic fluid is traveling from the pump to the hydraulic cylinder from borehole 44 to bore 41, as shown by the arrows, hydraulic fluid travels around and between the lower sleeve portion 18 and the inner wall portion 54 of the valve body 10 and into sleeve 12 through ports 15a and 15b. As shown, during this condition, piston 20 is forced toward bore hole 41 thereby causing relief ports 23a and 23b to be placed in communication with the relief region 56 of sleeve 12. Thus, flow is provided through side relief ports 23a and 23b as well as through the axial main port 22. When the flow direction is reversed, with fluid flowing from the hydraulic cylinder to the pump, and there is little or no back pressure as depicted in FIG. 4, spring 30 maintains the piston 20 in the fully extended position thereby allowing flow through the ports 23a and 23b. When the flow from the hydraulic cylinder to the motor is increased, as depicted in FIG. 5, piston 20 acts against the spring 30 and travels into sleeve 12 thereby closing off the fluid relief ports 23a and 23b such that flow occurs only through the main axial port 22. As the hydraulic fluid pressure further increases as shown in FIG. 6, the piston exerts yet a greater force against spring 30 traveling further into the sleeve 12 so as to partially block outlet ports 15a and 15b.

While the valve assembly disclosed in U.S. Pat. No. 5,320,135 may effectively regulate the flow of hydraulic fluid for the hydraulic cylinder of a hydraulic lift, it is not without shortcomings. If such a valve assembly were to be used to limit the flow of hydraulic fluid to a hydraulic motor by placing the valve in a hydraulic motor loop circuit, as shown in FIGS. 4–6 of U.S. Pat. No. 5,320,135, the fluid flow would initially have to overcome the resistance of spring 30 before the valve is moved from the condition shown in FIG. 4 to that shown in FIG. 5. This could result in a relatively rough transition wherein the fluid flow initially increases rapidly while the valve was in the condition of FIG. 4 and then rapidly decreases as the valve is moved to the condition shown in FIG. 5 wherein ports 23a and 23b are closed. The flow rate could then resume its increase until the valve begins to close ports 15a and 15b as depicted in FIG. 6. While this may be acceptable for the operation of a hydraulic lift, such a transition could result in the rough and unacceptable operation of a hydraulic motor driven wheel. This rough transition would likely be particularly evident when the direction of fluid flow to such a hydraulic motor was reversed and fluid flow was initially being increased.

An improved valve assembly is desired which may be used to efficiently regulate the flow of fluid in one direction to a hydraulic device without rapid or rough transitions and, in the other direction, allow unregulated fluid flow with minimal restriction thereby minimizing power losses and heating of the fluid.

SUMMARY OF THE INVENTION

The present invention provides a flow regulating valve that regulates the flow rate of a fluid through the valve in one direction and allows return fluid to efficiently flow through the valve in the opposite direction.

The invention comprises, in one form thereof, a valve assembly including a valve body defining a fluid passage extending through the valve body. The fluid passage has a first end and an opposite second end wherein the first end defines a first port through which fluid is communicated to and from the fluid passage and the second end defines a second port through which fluid is communicated to and from the fluid passage. A biasing element and a valve member are also provided. The valve member is moveably disposed within the fluid passage within the valve body and has a travel length extending from a first position relative to the valve body to a second position relative to the valve body. The biasing element biases the valve member along the travel length from the first position toward a third position disposed between the first and second positions. The valve member at least partially defines a variable first opening (e.g., variable annular opening 98), a second opening (e.g., metered orifice 62) and at least one third opening (e.g., openings 64). The first opening defines a variable constriction in the fluid passage between the first and second ends and has a size which progressively increases as the valve member moves from the first position toward the third position. The second opening and the at least one third opening define the second port wherein, when the valve member is disposed between the first position and the third position, the second port is defined substantially solely by the second opening and, when the valve member is in the second position, the second port is defined by both the second opening and the at least one third opening. The valve member defines a passage extending from the second port to the first opening and the biasing element is located outside the valve member passage. Fluid flow through the fluid passage in a first direction from the second end toward the first end exerts pressure upon the valve member and biases the valve member toward the first position. Fluid flow through the fluid passage in a second direction from the first end toward the second end exerts pressure upon the valve member and biases the valve member toward the second position.

The invention comprises, in another form thereof, a valve assembly including a valve body defining a fluid passage extending through the valve body. The fluid passage has a first end and an opposite second end. The first end defines a first port through which fluid is communicated to and from the fluid passage and the second end defines a second port through which fluid is communicated to and from the fluid passage. A biasing element and a valve member are also provided. The valve member is moveably disposed within the fluid passage within the valve body and has a travel length extending from a first position relative to the valve body to a second position relative to the valve body. The valve member further defines a third position along the travel length wherein the third position is disposed between the first and second positions. The valve member at least partially defines a variable first opening and the second port. The first opening defines a variable constriction in the fluid passage between the first and second ends and has a size that progressively increases as the valve member moves from the first position toward the third position. The second port is variably sized wherein the second port defines a first area providing fluid communication with the fluid passage when the valve member is in the third position and defines a second area providing fluid communication with the fluid passage when the valve member is in the second position with the second area being greater than the first area. The travel length includes a biased travel portion between the first and third positions wherein the biasing element biases the valve member from the first position towards the third position and an unbiased travel portion between the third position and the second position wherein the valve member is unbiased with respect to the biasing element. Fluid flow through the fluid passage in a first direction from the second end toward the first end exerts pressure upon the valve member and biases the valve member toward the first position. Fluid flow through the fluid passage in a second direction from the first end toward the second end exerts pressure upon the valve member and biases the valve member toward the second position.

The invention comprises, in yet another form thereof, a valve assembly including a valve body defining a fluid passage extending through the valve body. The fluid passage has a first end and an opposite second end. The first end defines a first port through which fluid is communicated to and from the fluid passage and the second end defines a second port through which fluid is communicated to and from the fluid passage. A spring is disposed within the fluid passage and is engageable with the valve body. A piston is moveably disposed within the fluid passage and is operably couplable with the spring. The piston has a travel length extending from a first position in the fluid passage to a second position in the fluid passage. The piston also defines a third position along the travel length wherein the third position is disposed between the first and second positions. The piston has a substantially cylindrical sidewall defining an axially extending passage through the piston and an end wall disposed at a first axial end of the piston. The piston at least partially defines a first opening, a second opening and at least one third opening. The first opening is in communication with the axial piston passage and is disposed at a second axial end of the piston opposite the first axial end. The first opening defines a variable constriction in the fluid passage between the first and second ends and has a size which progressively increases as the piston moves from the first position toward the third position. The end wall of the piston defines a second opening in communication with the axial piston passage and the piston sidewall defines at least one third opening proximate the end wall. When the piston is disposed between the first and third positions, the second port is defined substantially solely by the second opening and, when said piston is in the second position, the second port is defined by both the second opening and the at least one third opening. The spring is located outside the axial piston passage. Fluid flow through the fluid passage in a first direction from the second end toward the first end exerts pressure upon the piston and biases the piston toward the first position. Fluid flow through the fluid passage in a second direction from the first end toward the second end exerts pressure upon the piston and biases the piston toward the second position.

An advantage of the present invention is that it minimizes the restriction and enhances the return flow of fluid through the valve and thereby reduces power losses and the heat generated by the flow of return fluid through the valve in the unregulated direction. Additionally, by removing the spring from the interior of the piston, the calibration orifice of the piston may be enlarged thereby reducing the pressure drop experienced by fluid flowing through the calibration orifice and enhancing the operation of the valve for fluid flow in both the regulated and unregulated flow directions. The regulation of the fluid flow through the valve assembly in the regulated flow direction is also relatively smooth without abrupt transitions as the flow rate changes.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise forms disclosed.

DETAILED DESCRIPTION OF THE INVENTION

Figure 3:
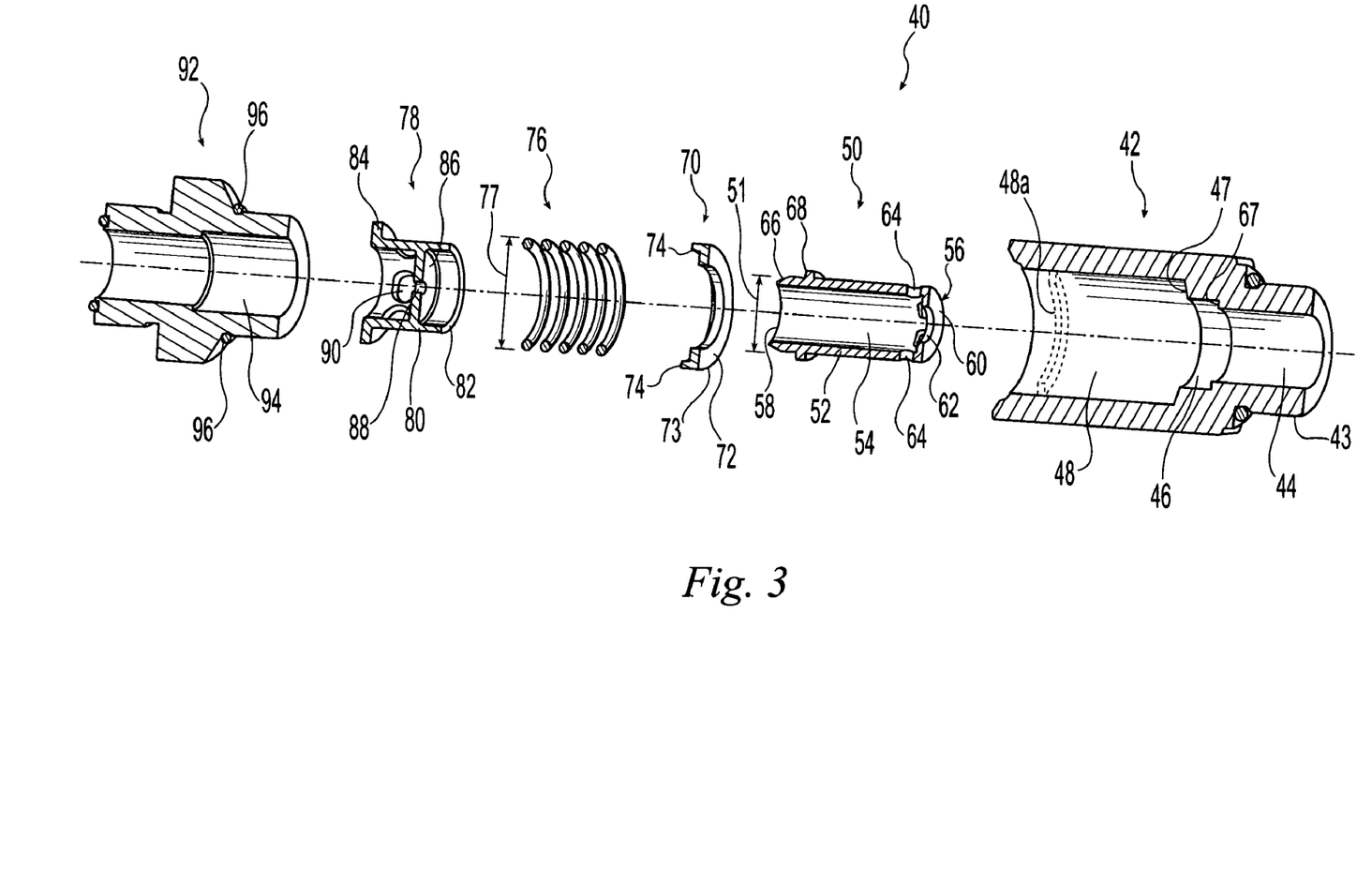
FIG. 3 is an exploded view of a valve in accordance with the present invention.

A valve assembly 40 in accordance with the present invention is shown in an exploded view in FIG. 3. Valve assembly 40 includes a valve body 42 having a passageway defined by three axially aligned cylindrical bore sections 44, 46, 48 of differing diameters. In the illustrated embodiment, valve member 50 takes the form of a piston 50 reciprocatingly disposed in valve body 42. Piston 50 includes a cylindrical sidewall 52 that defines interior passage 54 extending from first axial end 56 of piston 50 to the opposite second axial end 58 of piston 50. An endwall 60 is located at first axial end 56 and includes a metering orifice 62. A plurality of circumferentially spaced openings 64 are located in sidewall 52 proximate first axial end 56. Second axial end 58 of piston 50 is open, i.e., it does not include an endwall or otherwise define a restriction within axial passage 54. The radially outer surface of sidewall 52 at second axial end 58 forms a tapered surface 66 which cooperates with baffle member 78. Piston 50 also includes a radially outwardly extending flange 68.

A coupling member 70, which takes the form of a washer in the illustrated embodiment, is located between flange 68 and biasing element 76. Washer 70 includes a planar annular element 72 having a lip 74 located at its outer circumference. In the illustrated embodiment, biasing element 76 is a helical spring and the portion of spring 76 which directly engages washer 70 is seated within lip 74 to maintain the proper engagement of spring 76 with washer 70 during operation of valve 40.

A baffle member 78 is also shown in FIG. 3 and includes a cylindrical sidewall 80 having a first end 82. First end 82 of baffle 78 cooperates with second axial end 58 and tapered surface 66 to define a variable opening 98. A radially projecting flange 84 is used in the securement of baffle 78 within valve 40. An interior partition 86 extends across the interior space of the baffle and includes a bleed hole 88. Circumferentially spaced openings 90 are located in sidewall 80 with partition 86 being located between first end 82 and openings 90.

Baffle 78 is fixed within valve assembly 40 between adapter body 92 and valve body 42. Baffle 78 is fixed in place by spring 76 which biases radial flange 84 into engagement with adapter body 92. Alternative methods of securing baffle 78 may also be employed. Such alternative retaining means for preventing baffle member 78 from moving toward piston 50 during reverse flow conditions could include a snap ring seated in an annular groove in cylindrical bore 48, a radially inwardly projecting annular lip in bore 48, or a step in bore 48 that would engage radial flange 84. Dashed lines 48a in FIG. 3 illustrate schematically represent such an alternative retaining means that could be formed by a snap ring or annular lip. The function of baffle 78 might also be incorporated into another component part of valve assembly 40 such as adaptor body 92 or valve body 42. For example, baffle 78 could be integrally formed with adaptor body 92. Adapter body 92 includes an interior fluid passage 94 that is in fluid communication with bore 48 to thereby form a fluid passage 100 extending through valve assembly 40 between first port 102 and second port 104. An O-ring 96 is used to provide a seal between adapter body 92 and valve body 42. Other suitable means for providing a seal may also be employed.

Figure 4:
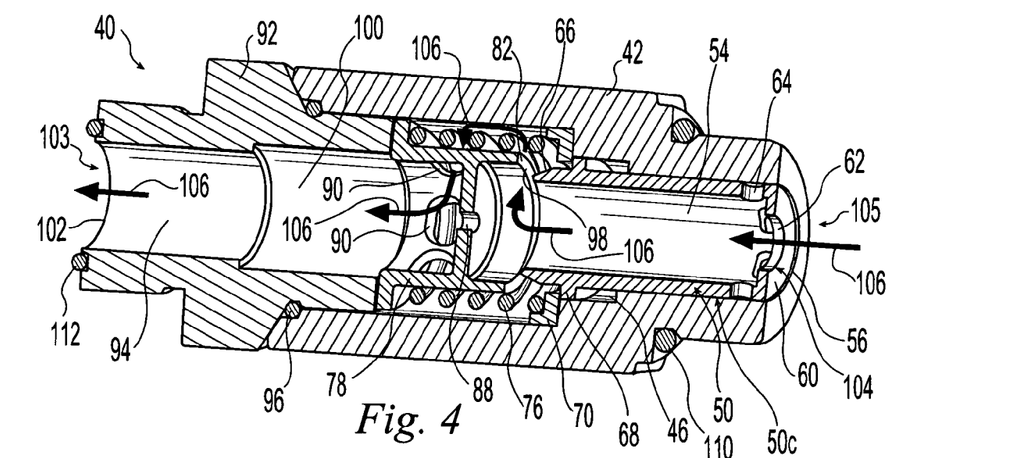
FIG. 4 is a cross sectional view of the valve of FIG. 3 wherein fluid is flowing in the regulated direction at less than the maximum flow rate.

FIG. 4 illustrates valve assembly 40 with fluid flowing in a first direction from the second end 105 of fluid passage 100 to the first end 103 of fluid passage 100 as indicated by flow arrows 106. The flow direction illustrated in FIG. 4 is the regulated flow direction of valve assembly 40. As shown in FIG. 4, the flow path of fluid through fluid passage 100 of valve assembly 40 begins with fluid entering passage 100 through second port 104. When piston 50 is in the position shown in FIG. 4, the second port is defined solely by opening 62 which forms a metered orifice. Fluid enters axial passage 54 through second port 104 and subsequently passes through variable opening 98 to enter bore section 48 where it passes through and around spring 76 before entering openings 90 in baffle 78. After passing through baffle 78, the fluid enters passage 94 in outlet adapter 92 and then exits valve assembly 40 through first port 102.

FIG. 4 illustrates the condition wherein the fluid flow and pressure differential on opposite sides of piston 50 is not sufficient to overcome the biasing force of spring 76. In this condition, spring 76 biases washer 70 into engagement with end face 47 of bore 48 in valve body 42. Relief bore 46 is configured to allow flange 68 to be received therein and prevent the entry of washer 70. In the illustrated embodiment, this is accomplished by using a circular washer 70 having a diameter greater than cylindrical bore 46, however, other geometric shapes may also be employed. When fluid is flowing in the direction indicated by flow lines 106, a pressure differential between different points in the fluid path will exist and will generate forces acting upon piston 50, primarily the pressure differential on either side of orifice 62 which acts upon end wall 60, and will bias piston 50 to the position shown in FIG. 4. At relatively low flow rates, the force acting on piston 50 generated by the pressure differential will be relatively low and be unable to overcome the biasing force of spring 76.

Figure 5:
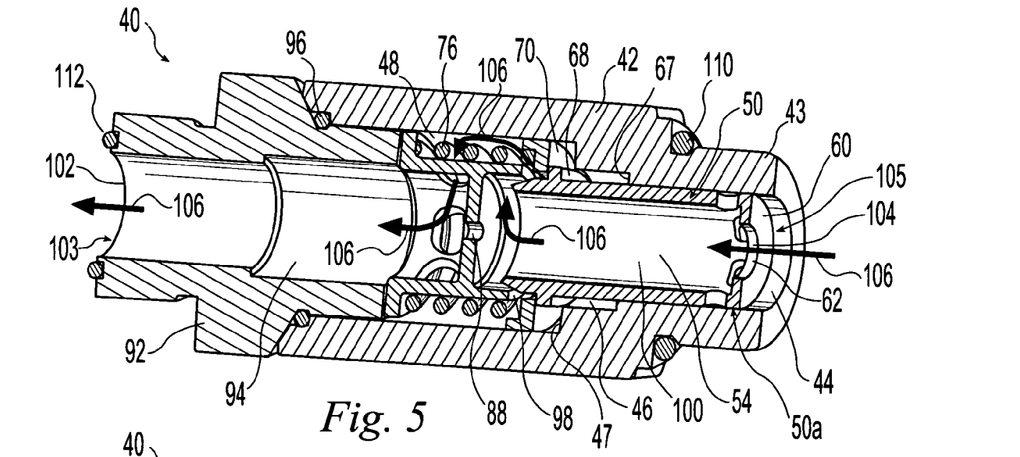
FIG. 5 is another cross sectional view of the valve of FIG. 3 wherein fluid is flowing in the regulated direction at the maximum flow rate.

FIG. 5 illustrates valve assembly 40 with fluid flowing in the same direction as shown in FIG. 4 but wherein the pressure differential on opposite sides of piston 50 is higher. In the condition illustrated in FIG. 5, the force acting on piston 50 generated by the pressure differential is large enough to compress spring 76 and bias piston 50 toward baffle member 78. As piston 50 is biased towards baffle 78, annular opening 98 becomes progressively smaller and thereby acts to restrict the flow of fluid through fluid passage 100. Generally, a higher pressure differential would result in a higher flow rate through a given fluid passage. However, due to the variable constriction in fluid passage 100 defined by variable opening 98, opening 98 acts to constrict the flow of fluid through passage 100 and thereby counteracts the flow increasing effects of an increasing pressure differential. At a sufficiently high pressure differential, opening 98 may be completely closed with tapered surface 66 engaging baffle end 82. If opening 98 is completely closed, a small quantity of fluid may still pass through bleed hole 88 and allow some fluid to be conveyed through fluid passage 100. Thus, the operable coupling of spring 76 with piston 50 provides a restriction, i.e., opening 98, that varies in response to the pressure differential of the fluid on opposite sides of the restriction and thereby provides a flow compensating mechanism which limits the flow rate of fluid through valve assembly 40 to a maximum value. The precise value of the maximum flow rate will be determined not only by the dimensions of opening 62, the spring force of spring 76 and the configuration of variable opening 98, but also by the properties of the fluid flowing through the valve assembly as will be recognized by those having ordinary skill in the art.

Figure 6:
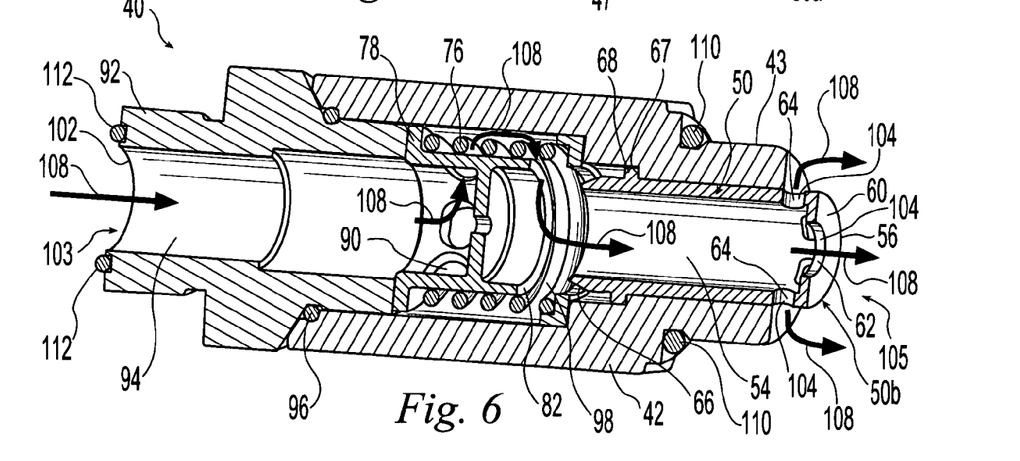
FIG. 6 is another cross sectional view of the valve of FIG. 3 wherein fluid is flowing in the unregulated direction.

FIG. 6 illustrates valve assembly 40 with fluid flowing in a direction reverse to that depicted in FIGS. 4 and 5 as indicated by flow arrows 108 and sometimes referred to as the unregulated direction. When fluid flows in the direction depicted in FIG. 6, if piston 50 is initially in the position shown in FIG. 5, it will be biased by spring 76 into the position shown in FIG. 4. At this position, a radial outer portion 73 of coupling member 70 engages endface 47 to limit the travel of the coupling member, e.g., washer 70. Piston 50 will then be biased to the position shown in FIG. 6 due to the pressure differential and forces imparted to piston 50 by the fluid impinging upon piston 50, primarily upon end wall 60, as the fluid flows through valve assembly 40. The travel of piston 50 will be stopped at the position shown in FIG. 6 due to the engagement of flange 68 with end face or ledge 67 between cylindrical passage sections 46 and 44. Thus, piston 50 has a length of travel from a first position 50*a* depicted in FIG. 5 to a second position 50*b* depicted in FIG. 6 which has a biased portion and an unbiased portion with respect to spring 76. Piston 50 also has a third position 50*c*, depicted in FIG. 5, between the first and second positions 50*a*, 50*b*. When piston 50 is located between the first position 50*a* and third position 50*c*, spring 76 exerts a biasing force on piston 50 urging it towards the third position 50*c*, thus, that portion of the travel length of piston 50 between positions 50*a* and 50*c* is a biased portion. When piston 50 is located between positions 50*c* and 50*b*, piston 50 is unbiased with respect to spring 76. As described above, however, piston 50 is biased by the flow of fluid either toward or away from baffle 78 when it is between positions 50*c* and 50*b*.

When piston 50 is between positions 50*a* and 50*c* shown in FIGS. 5 and 4 respectively, second port 104 is defined solely by metering orifice 62 which has a fixed area for the communication of fluid therethrough. As piston 50 moves from position 50*c* to position 50*b* shown in FIG. 6, first end 56 of piston 50 is projected beyond cylindrical section 43 of valve body 42 exposing openings 64 in sidewall 52. As openings 64 are exposed, the area of second port 104 is effectively enlarged enhancing the outflow of fluid from fluid passage 100. In the illustrated embodiment, variable opening 98 is also enlarged as piston 50 moves from position 50*c* (FIG. 4) to position 50*b* (FIG. 6) and increases the gap between baffle end 82 and piston end 58. It is not necessary for opening 98 to vary in area when piston 50 is between positions 50*c* and 50*b* because valve assembly 40 is not performing a flow regulating function when fluid flow positions piston 50 between 50*c* and 50*b*. The continued enlargement of opening 98, however, whereby opening 98 has its largest area when piston 50 is in position 50*b*, does advantageously enhance the flow of fluid through valve assembly 40 in the reverse or unregulated direction depicted in FIG. 6.

When the valve assembly is in the condition shown in FIG. 6 and the flow of fluid is reversed, piston 50 will initially be in the position shown in FIG. 6, however, since piston 50 is unbiased by spring 76 in this position, piston 50 will move to the position shown in FIG. 4 almost immediately upon the reversal of fluid flow due to the forces acting on piston 50 caused by the flow of fluid through valve assembly 40 and the flow rate will not be subject to a later rough transition caused by the closure of openings 64. Thus, by providing a piston 50 with a travel length having a portion unbiased by spring 76, the flow of fluid through valve 40 in the direction shown in FIG. 4 almost immediately closes openings 64 and allows the flow rate of the hydraulic fluid to be smoothly regulated.

It is also noted that the efficient flow of fluid through valve assembly 40 is enhanced by the use of a large diameter spring that is located radially outwardly of cylindrical sidewall 52 of piston 50. By providing a spring 76 having a diameter 77 that is larger than the diameter 51 of piston 50 and locating spring 76 outside of the axial passage of the piston, opening 62 in end wall 60 can be made larger because end wall 60 no longer must engage spring 76. The use of a larger metering orifice 62 facilitates the efficient conveyance of fluid through valve assembly 40 in both directions. By more efficiently conveying fluid through valve assembly 40, the fluid will experience a smaller pressure loss and generate less heat as it passes through orifice 62 and valve assembly 40.

Also seen in FIGS. 3–6 is an O-ring 110 located on cylindrical section 43. O-ring 110 is used to provide a seal between valve body 42 and the structure to which valve body 42 is secured. In a typical installation, valve body 42 would be threaded into the port of a cast iron valve body. Similarly, O-ring 112 located on adapter body 92 is used to provide a seal between adapter body 112 and a fluid conduit or other fluid conveyance structure. In a typical installation, adaptor body 92 would be placed in communication with a fluid conduit, e.g., a hose or tube, leading to a hydraulic motor.

While this invention has been described as having an exemplary design, the present invention may be further modified within the spirit and scope of this disclosure. This application is therefore intended to cover any variations, uses, or adaptations of the invention using its general principles.

What is claimed is:

1. A valve assembly comprising:
   a valve body defining a fluid passage extending through said valve body, said fluid passage having a first end and an opposite second end, said first end defining a first port through which fluid is communicated to and from said fluid passage and said second end defining a second port through which fluid is communicated to and from said fluid passage;
   a biasing element;
   a valve member moveably disposed within said fluid passage within said valve body, said valve member having a travel length extending from a first position relative to said valve body to a second position relative to said valve body, said biasing element biasing said valve member along said travel length from said first position toward a third position disposed between said first and second positions, said valve member at least partially defining a variable first opening, a second opening and at least one third opening, said first opening defining a variable constriction in said fluid passage between said first and second ends and having an area which progressively increases as said valve member moves from said first position toward said third position, said second opening and said at least one third opening defining said second port wherein when said valve member is disposed between said first position and said third position said second port is defined substantially solely by said second opening and when said valve member is in said second position said second port is defined by both said second opening and said at least one third opening;
   wherein said valve member defines a valve member passage extending from said second port to said first opening, said biasing element being disposed outside said valve member passage; and
   wherein fluid flow through said fluid passage within said valve body in a first direction from said second end toward said first end exerts pressure upon said valve member and biases said valve member toward said first position and wherein fluid flow through said fluid passage within said valve body in a second direction from said first end toward said second end exerts pressure upon said valve member and biases said valve member toward said second position.

2. The valve assembly of claim 1 wherein said valve member is a substantially cylindrical piston.

3. The valve assembly of claim 2 wherein said piston includes an end wall disposed at a first axial end of said piston and a substantially cylindrical sidewall wherein said valve member passage is an axially extending passage through said piston defined by said sidewall, said second opening in communication with said axial passage and being defined by said end wall, said first opening disposed proximate a second axial end of said piston opposite said first axial end, said at least one third opening being defined in said side wall proximate said first axial end of said piston.

4. The valve assembly of claim 3 wherein said piston is reciprocable within a substantially cylindrical bore defined in said valve body, said first axial end of said piston being disposed within said bore and substantially preventing the flow of fluid through said at least one third opening when said piston is disposed between said first and third positions and wherein said first axial end of said piston projects beyond said bore exposing said at least one third opening and permitting fluid flow therethrough when said piston is disposed in said second position.

5. The valve assembly of claim 3 wherein said cylindrical sidewall defines a first diameter and said biasing element is a helical spring defining a second diameter, said second diameter being larger than said first diameter.

6. The valve assembly of claim 1 wherein said travel length of said valve member includes a biased travel portion between said first and third positions wherein said biasing element biases said valve member from said first position toward said third position and an unbiased travel portion between said third-position and said second position wherein said valve member is unbiased with respect to said biasing element.

7. The valve assembly of claim 1 wherein movement of said valve member from said third position to said second position increases the area of said first opening.

8. The valve assembly of claim 1 wherein said second opening is a metering orifice having a fixed area and wherein operable coupling of said biasing element and said valve member to define said variable first opening provides a pressure-compensated flow control mechanism whereby said valve assembly limits fluid flow through said fluid passage in said first direction to a predefined maximum flow rate.

9. The valve assembly of claim 1 wherein movement of said valve member from said third position to said second position increases the area of said first opening.

10. A valve assembly comprising:
    a valve body defining a fluid passage extending through said valve body, said fluid passage having a first end and an opposite second end, said first end defining a first port through which fluid is communicated to and from said fluid passage and said second end defining a second port through which fluid is communicated to and from said fluid passage;
    a biasing element;
    a valve member moveably disposed within said fluid passage within said valve body, said valve member having a travel length extending from a first position relative to said valve body to a second position relative to said valve body, said valve member further defining a third position along said travel length, said third position disposed between said first and second positions, said valve member at least partially defining a variable first opening and said second port, said first opening defining a variable constriction in said fluid passage between said first and second ends and having an area that progressively increases as said valve member moves from said first position toward said third position, said second port being variably sized wherein said second port defines a first area providing fluid communication with said fluid passage when said valve member is in said third position and defines a second area providing fluid communication with said fluid passage when said valve member is in said second position, said second area being greater than said first area;

said travel length including a biased travel portion between said first and third positions wherein said biasing element biases said valve member from said first position towards said third position and an unbiased travel portion between said third position and said second position wherein said valve member is unbiased with respect to said biasing element; and wherein fluid flow through said fluid passage in a first direction from said second end toward said first end exerts pressure upon said valve member and biases said valve member toward said first position and wherein fluid flow through said fluid passage in a second direction from said first end toward said second end exerts pressure upon said valve member and biases said valve member toward said second position.

11. The valve assembly of claim 10 wherein said second port is defined by a second opening having a fixed area and at least one third opening, said second port being defined by said second opening when said valve member is between said first and third positions and said second port being defined by both said second opening and said at least one third opening when said valve member is in said second position.

12. The valve assembly of claim 10 wherein said valve member is a substantially cylindrical piston.

13. The valve assembly of claim 12 wherein said piston includes a substantially cylindrical sidewall defining an axially extending passage through said piston and an end wall disposed at a first axial end of said piston, said second port including a second opening defined by said end wall and in communication with said axial passage and at least one third opening defined by said sidewall and disposed proximate said first axial end of said piston, said first opening disposed proximate a second axial end of said piston opposite said first axial end.

14. The valve assembly of claim 13 wherein said piston is reciprocable within a substantially cylindrical bore defined in said valve body, said first axial end of said piston being disposed within said bore and substantially preventing the flow of fluid through said at least one third opening when said piston is disposed between said first and third positions and wherein said first axial end of said piston projects beyond said bore exposing said at least one third opening and permitting fluid flow therethrough when said piston is disposed in said second position.

15. The valve assembly of claim 13 wherein said cylindrical sidewall defines a first diameter and said biasing element is a helical spring defining a second diameter, said second diameter being larger than said first diameter.

16. The valve assembly of claim 15 further comprising a coupling member operably disposed between said spring and said piston, said coupling member operably engageable with said piston and transferring a biasing force from said spring to said piston when said piston is disposed between said first and third positions and wherein movement of said piston from said third position toward said second position operably disengages said coupling member and said piston.

17. The valve assembly of claim 10 wherein said second port includes a metering orifice having a fixed area defining said first area and wherein operable coupling of said biasing element and said valve member to define said variable first opening provides a pressure-compensated flow control mechanism whereby said valve assembly limits fluid flow through said fluid passage in said first direction to a predefined maximum flow rate.

18. A valve assembly comprising:
a valve body defining a fluid passage extending through said valve body, said fluid passage having a first end and an opposite second end, said first end defining a first port through which fluid is communicated to and from said fluid passage and said second end defining a second port through which fluid is communicated to and from said fluid passage;
a spring disposed within said fluid passage and engageable with said valve body;
a piston moveably disposed within said fluid passage and operably couplable with said spring, said piston having a travel length extending from a first position in said fluid passage to a second position in said fluid passage, said piston further defining a third position along said travel length, said third position disposed between said first and second positions, said piston having a substantially cylindrical sidewall defining an axially extending passage through said piston and an end wall disposed at a first axial end of said piston, said piston at least partially defining a first opening, a second opening and at least one third opening, said first opening being in communication with said axial piston passage and disposed at a second axial end of said piston opposite said first axial end, said first opening defining a variable constriction in said fluid passage between said first and second ends and having a size which progressively increases as said piston moves from said first position toward said third position, said end wall of said piston defining said second opening, said second opening being in communication with said axial piston passage, said piston sidewall defining said at least one third opening proximate said end wall wherein, when said piston is disposed between said first and third positions, said second port is defined substantially solely by said second opening and when said piston is in said second position, said second port is defined by both said second opening and said at least one third opening;
wherein said spring is disposed outside said axial piston passage; and
wherein fluid flow through said fluid passage in a first direction from said second end toward said first end exerts pressure upon said piston and biases said piston toward said first position and wherein fluid flow through said fluid passage in a second direction from said first end toward said second end exerts pressure upon said piston and biases said piston toward said second position.

19. The valve assembly of claim 18 wherein said piston is reciprocable within a substantially cylindrical bore defined in said valve body, said first axial end of said piston being disposed within said bore and substantially preventing the flow of fluid through said at least one third opening when said piston is disposed between said first and third positions and wherein said first axial end of said piston projects beyond said bore exposing said at least third opening and permitting fluid flow therethrough when said piston is disposed in said second position.

20. The valve assembly of claim 18 wherein said cylindrical sidewall defines a first diameter and said spring is a helical spring defining a second diameter, said second diameter being larger than said first diameter.

21. The valve assembly of claim 20 wherein said piston includes a radially outwardly extending flange operably couplable with said spring.

22. The valve assembly of claim 21 further comprising a coupling member operably disposed between said spring and said flange, said coupling member having an outer perimeter disposed radially outwardly of said flange, said coupling member operably engageable with said flange and transferring a biasing force from said spring to said flange when said piston is between said first and third positions, a radially outer portion of said coupling member engaging said valve body when said piston is in said third position and movement of said piston from said third position to said second position operably disengaging said coupling member and said flange.

23. The valve assembly of claim 22 wherein said flange is received in a relief bore having a configuration preventing the entry of said coupling member to disengage said coupling member and said flange.

24. The valve assembly of claim 18 wherein movement of said piston from said third position to said second position increases the area of said first opening.

25. The valve assembly of claim 18 wherein said travel length of said piston includes a biased travel portion between said first and third positions wherein said spring biases said piston from said first position toward said third position and an unbiased travel portion between said third position and said second position wherein said piston is unbiased with respect to said spring.

26. The valve assembly of claim 18 wherein said second opening is a metering orifice having a fixed area and said valve assembly further comprises a baffle member disposed within said fluid passage wherein said variable first opening is defined between said baffle member and said piston and operable coupling of said spring and piston provides a pressure-compensated flow control mechanism whereby said valve assembly limits fluid flow through said fluid passage in said first direction to a predefined maximum flow rate.

27. The valve assembly of claim 26 wherein fluid flow through said fluid passage in said second direction is substantially unregulated by said valve assembly.

* * * * *